UNITED STATES PATENT OFFICE.

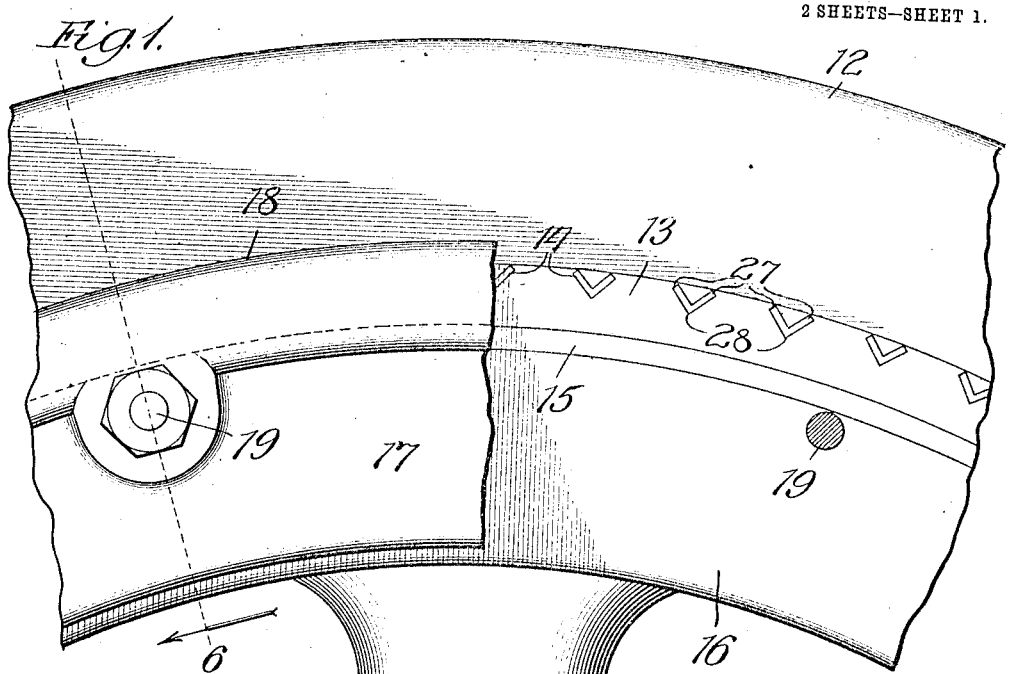

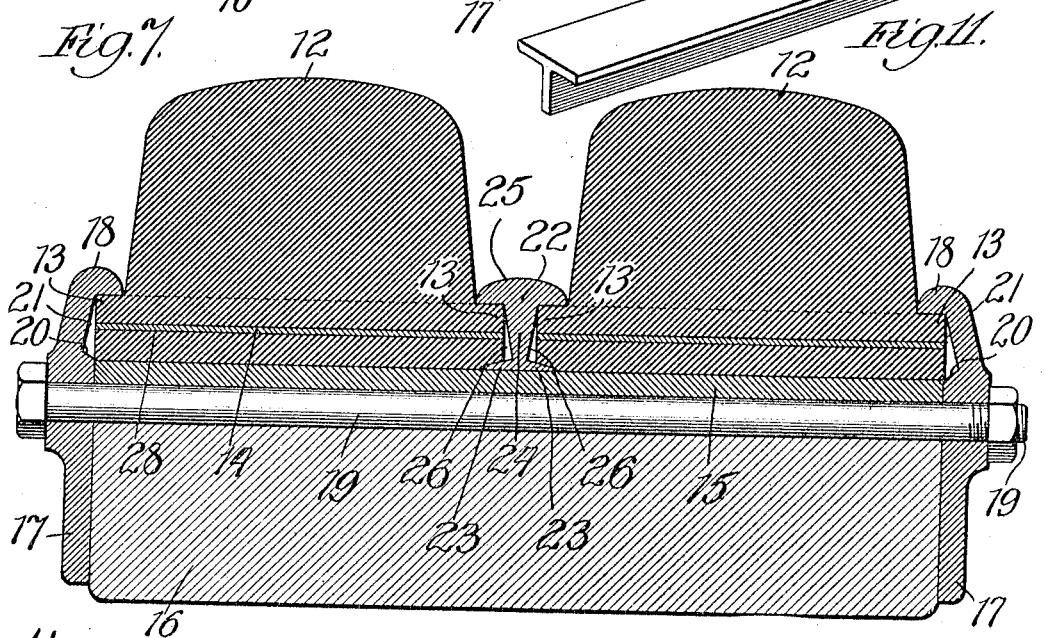

WILLIAM A. KÖNEMAN, OF CUDAHY, WISCONSIN.

VEHICLE-TIRE.

949,375.  Specification of Letters Patent.  Patented Feb. 15, 1910.

Application filed December 26, 1908. Serial No. 469,285.

*To all whom it may concern:*

Be it known that I, WILLIAM A. KÖNEMAN, a citizen of the United States, residing at Cudahy, in the county of Milwaukee and State of Wisconsin, have invented a new and useful Improvement in Vehicle-Tires, of which the following is a specification.

My invention relates to that class of vehicle-tires wherein a solid tire formed of rubber or analogous material has lateral flanges for the purpose of securing it to the wheel and is provided at intervals with transverse metal inserts molded in the tire and extending through the same at its flanges for the purpose of affording to the tire a more secure fastening. In tires of this type as heretofore provided and in common use, these inserts are of such shape in cross-section as to tend, under the kneading action to which the rubber is subjected while the wheel is in use, to wear or cut through the tire to the rim, resulting in destroying their efficiency as a holding medium and in permitting the tread and flange to become cracked, or torn apart, or in allowing the flanges to spring out from their locked engagement with the clamping rings, thereby greatly shortening the life of the tire.

My object is to overcome these faults, and to that end I construct a tire in which inserts are used of such form in transverse section and arranged in such spaced relation to each other as to reduce to the minimum the wearing and cutting tendencies referred to, and even in the event of such cutting eventually taking place, to still retain such a hold or lock upon the rubber as to maintain it in place upon the wheel and thus permit the maximum wear of the tire.

My invention is illustrated in the accompanying drawings in which—

Figure 1 is a view in broken side elevation of a portion of a wheel; Fig. 2 is an enlarged broken view in side elevation of a portion of the tire showing two of my inserts in their preferred form in position therein; Figs. 3, 4 and 5 are views similar to Fig. 2, showing other forms of inserts suitable to my improvement; Fig. 6 is a view in transverse section taken at the line 6 on Fig. 1; Fig. 7 is a view similar to that presented in Fig. 6, but showing a double, or dual tire embodying my improvement; and Figs. 8, 9, 10 and 11 are perspective views respectively of the inserts shown in Figs. 2, 3, 4 and 5.

The tire comprises a tread-portion 12 and lateral flanges 13 projecting beyond the body-portion thereof sufficiently to provide requisite clamping surfaces for the attachment of the tire to the wheel. Metal inserts 14 are molded in the base-portion of the tire in its formation and are preferably of such a length as to extend at their ends just flush with the outer edges of the flanges and are so disposed that their outer surfaces are flush with the peripheral faces of the flanges. The tire is placed about the rim 15 surrounding the felly 16 of a wheel and clamping-rings 17, provided with lips 18, are fastened on opposite sides of the felly so that the lips overlap and engage the flanges 13. The rings are securely held in position, as by bolts 19 passing at intervals through the rings and felly. The extreme width of the tire over all at the flanges preferably just equals that of the rim which it surrounds, and the outer edges of the flanges and ends of the inserts impinge against the inner faces of the rings at their line to form a snug fit and thereby prevent any lateral movement of the tire when in a normal condition. From the lip the inner face of each ring recedes and forms an oblique face extending to an annular shoulder 20 which meets the periphery of the rim to provide a tapering recess 21 between the flange and adjacent face of the clamping-ring. This space allows freedom of movement of the flanges between the rim and lips, under the compression of the tire, and insures a rigid seat for the impinging edge of the flanges when the tire is in its normal condition.

When it is desired to provide a tire for heavy trucks, or the like, or where for other reasons it is essential to have a wheel with a wide face, I prefer to use a double, or dual tire, each member thereof being of the form shown in Fig. 6. These members are applied to the wheel rim in the same manner as the tire previously described and as illustrated in Fig. 6, and the outer flange of each tire-member is similarly held in place by a clamping-ring. For confining the adjacent inner flanges of the tire-members in place, a band 22 is secured about the rim centrally thereof. The inner flanges 23 of this band are preferably beveled from the web 24 to form thin edges, and the outer flanges are enlarged to form a head 25, the web being tapered on opposite sides from the head to the inner flanges, to form inwardly-tapering channel-like recesses 26, on opposite sides of the web and between it and the flanges of the tire, similar to and for the same purpose as the recesses 21. It will be understood that the band may fit the rim snugly and slide under compression or it may be suitably secured in place about the rim, after which the tire-members are slipped upon the rim with their inner flanges crowded to their seats within the flanges of the band 22.

For maintaining the tire in position upon the wheel through the medium of the metal reinforcing inserts, I adopt inserts of such form in cross-section, and so position them about the tire, that they maintain a locked engagement with the tire itself regardless of whether they cut through the tire or not, but I employ inserts of such form as will tend to avoid the cutting action referred to. To illustrate: Assuming the V-shape inserts 14 shown in Fig. 2, to be five-eighths of an inch across the sides 27 with three-quarters of an inch space between the sides of adjacent inserts, this would provide a distance of one and three-eighths inches between the apexes 28 of the adjacent inserts. Now assuming that, under the action to which the tire is subjected in use, the points 28 should eventually cut through the tire, as indicated by dotted lines, a head 29 of one and three-eighths inches in width would still remain between inserts, with each head connected with the body-portion of the tire by a neck 30 equal to the space between the edges of the same inserts, or three-quarters of an inch. The width of the head being so much greater than that of the neck, sufficient compression of the head-portion could not take place to permit it to be withdrawn from between inserts, with the result that the heads form anchors for the tire to prevent such separation. For limiting the cutting action, such form of insert is used as will present a surface to the rubber between it and the rim, having an area sufficiently great to offer a resistance in excess of the force of compression of the rubber at the tread. The V-shaped inserts 14 afford one form for the purpose. In Fig. 3, U-shaped inserts 31 are shown, while in Fig. 4, channel-inserts 32 are represented, which are preferably arranged in pairs; and in Fig. 5, T-shaped inserts 33 are illustrated as forms which may be employed. By referring to the various figures it will be observed that much the same head or anchor is formed between the different inserts. In the form shown in Fig. 4, however, the head is contained within the pairs of channels, though in all forms the neck-portion of the anchor, which is characteristic of my improvement, is formed between flanges or adjacent edges of the inserts.

What I claim as new, and desire to secure by Letters Patent is—

1. In combination, a vehicle-tire provided with lateral flanges formed with cylindrical upper surfaces and sides extending at a right-angle thereto, inserts extending crosswise of the tire, a supporting rim for the tire, clamping-rings provided with lips engaging over the upper surfaces of the flanges and with continuous annular faces outwardly tapering from the lips, whereby a space is formed between the sides of the flanges and said clamping-ring, and means for securing said clamping rings in place, for the purpose set forth.

2. In combination, a dual-tire having each member provided with lateral flanges formed with cylindrical upper surfaces and sides extending at a right angle thereto, inserts extending crosswise of each of said members, a rim supporting the members, clamping rings on opposite sides of the rim provided with lips engaging over the upper surfaces of the adjacent tire-flanges and with continuous annular faces outwardly tapering from the lips, a band about the rim between said members provided with inwardly tapering channel-faces, and means for holding said rings to the rim, for the purpose set forth.

3. In combination, a dual-tire having each member provided with lateral flanges formed with outwardly tapering upper surfaces and sides extending at a right angle thereto, inserts extending crosswise of each of said members, a rim supporting the members, clamping rings on opposite sides of the ring, provided with lips engaging over the upper surfaces of the adjacent tire-flanges and with outwardly tapering faces, a band about the rim between said members having inner flanges, an outer head engaging the upper surfaces of the adjacent tire-flanges and a web having inwardly tapering faces extending between said head and flanges, and means for holding said rings to the rim, for the purpose set forth.

4. In combination, a vehicle-tire provided with lateral flanges formed with cylindrical upper surfaces and sides extending at a right angle thereto, a series of inserts so embedded in the tire as to have freedom of movement radially of the wheel and in a direction toward its center as the material of the tire is compressed and forced outwardly and forming of the tire-material necks between the outermost edges of pairs of said inserts, a rim supporting the tire, clamping-rings provided with lips engaging one of the upper surfaces of the tire-flanges and with continuous annular faces outwardly tapering from the lips and into which the sides of the inserts extend, and means for securing the rings in place, for the purpose set forth.

5. In combination, a vehicle-tire provided with lateral flanges formed with cylindrical upper surfaces and sides extending at a right angle thereto, a series of V-shaped metal inserts embedded in the tire to extend transversely thereof with their ends flush with the flange-sides, said inserts forming between the outer edges of pairs thereof necks of the tire-material, a rim supporting the tire, clamping-rings provided with lips engaging over the upper surfaces of the flanges and with continuous annular faces outwardly tapering from the lips and into which the ends of the inserts extend, and means for securing the rings in place for the purpose set forth.

WILLIAM A. KÖNEMAN.

In presence of—
R. S. CALDWELL,
ALMA A. KLUG.